United States Patent [19]

Epple et al.

[11] Patent Number: 5,663,265
[45] Date of Patent: Sep. 2, 1997

[54] COPOLYMERS CONTAINING HYDROXYL AND CARBOXYL GROUPS BY REACTING GLYCIDYL ESTERS AND CARBOXYL MONOMERS

[75] Inventors: Ulrich Epple; Uwe Kubillus; Holger Schmidt, all of Wiesbaden, Germany

[73] Assignee: Hoechst Aktiengesellschaft, Frankfurt am Main, Germany

[21] Appl. No.: 424,081

[22] Filed: Apr. 19, 1995

[30] Foreign Application Priority Data

May 2, 1994 [DE] Germany ............ 44 15 319.8

[51] Int. Cl.$^6$ .................. C08F 220/06; C08F 220/28
[52] U.S. Cl. ............. 526/320; 526/308; 526/318.4; 526/318.47; 526/318.44; 526/318.6; 528/393
[58] Field of Search ............ 526/308, 318.4, 526/318.42, 318.44, 320, 318.6; 525/330.1; 528/393

[56] References Cited

U.S. PATENT DOCUMENTS

| | | | |
|---|---|---|---|
| 3,330,814 | 7/1967 | Vasta et al. | 260/88.1 |
| 3,644,255 | 2/1972 | Thompson | 524/265 |
| 4,123,401 | 10/1978 | Berghmans et al. | 524/413 |
| 4,350,809 | 9/1982 | Fischer et al. | 528/361 |
| 4,710,556 | 12/1987 | Plum | 526/273 |
| 5,136,004 | 8/1992 | Bederke et al. | 526/273 |
| 5,153,257 | 10/1992 | Dalibor | 524/284 |
| 5,179,157 | 1/1993 | Dalibor | 524/548 |
| 5,180,773 | 1/1993 | Dalibor | 524/853 |

FOREIGN PATENT DOCUMENTS

| | | |
|---|---|---|
| 2048444 | 2/1992 | Canada . |
| 2074104 | 1/1993 | Canada . |
| 0 635 523 | 1/1995 | European Pat. Off. . |
| 0 000 608 | 2/1979 | Germany . |
| 28 51 613 | 6/1980 | Germany . |

*Primary Examiner*—Robert E. Sellers
*Attorney, Agent, or Firm*—Foley & Lardner

[57] ABSTRACT

Low-viscosity copolymers useful in coating compositions, containing hydroxyl and carboxyl groups are obtained by free-radical polymerization of A) from 3 to 50% by weight of one or more glycidyl esters of aliphatic saturated monocarboxylic acids having a tertiary or quaternary α carbon atom, and B) from 97 to 50% by weight of at least two olefinically unsaturated copolymerizable monomers of which at least one contains at least one COOH group and at least one is sterically hindered, the quantity of COOH groups in component B exceeding the quantity of epoxy groups in component A to such an extent that the resulting copolymer has an acid number of at least 15 mg of KOH/g.

22 Claims, No Drawings

COPOLYMERS CONTAINING HYDROXYL AND CARBOXYL GROUPS BY REACTING GLYCIDYL ESTERS AND CARBOXYL MONOMERS

BACKGROUND OF THE INVENTION

The use of high-solids coating compositions to reduce the emission of organic compounds when a coating material is applied is to be welcomed from an environmental viewpoint.

It is known that binders for such coatings can be prepared by polymerization in bulk, in which one component, for example, a glycidyl ester or a maleate is introduced as initial charge at the beginning of the polymerization and this ester or this monomer is incorporated fully into the copolymer in the subsequent course of the polymerization, with the addition of (in the case of the maleate, further) monomers. See EP-A 0 027 931, EP-A 0 056 971 and DE-P-43 24 801.2.

In the case of bulk polymerization with a glycidyl ester, the ester is introduced as initial charge and then reacted completely with monomers of which at least one contains at least equimolar quantities of acid and/or anhydride groups. The monomers with anhydride groups are at least partially hydrolyzed. Thus, in addition to the polymerization, a reaction of the epoxide groups with the carboxyl groups takes place in which in each case one ester group and one secondary hydroxyl group are formed.

The advantage of bulk polymerization, in comparison with polymerization in a solvent, lies in the freedom of choice of the solvents used for dilution after the end of the reaction. By this means, it is possible to formulate even for very high concentrations of binder in the solvent. A further advantage is that low-boiling solvents, for example, n-butyl acetate, can be used to dilute the polymer, and that high-boiling solvents which in some cases are toxicologically objectionable, for example, alkylated aromatic compounds, can be substantially avoided.

The advantage of this bulk polymerization, in comparison to a pure mass polymerization, is that it enables good dissipation of the heat of reaction and therefore a safe reaction procedure. The correct choice of the reaction parameters, in particular of the reaction temperature of the initiator, then leads to products with low viscosities and thus to high-solids contents in a finished coating formulation, as described in EP-A 0 027 931 and in DE-P-43 24 801.2.

From a point of view of applications, high-solids products with a high proportion of acid and/or anhydride groups are desirable because, for example, they result in a sharp acceleration of curing in automotive refinishing. Even quicker dust-drying and freedom from tack with the same pot life are requirements which are frequently made by the vehicle finishing workshops.

For the basecoat/clearcoat process in the production-line finishing of automobiles it is equally important to use clearcoats having as low as possible a content of organic solvents. Moreover, a further aim is to replace high-solvent by low-solvent solid-color topcoats.

Owing to their application, these production-line or OEM coating materials are baked at an elevated temperature. They are intended after baking to give paint films which are free from boil marks and are of good appearance with good resistance properties. Frequent complaints from the automobile manufacturers concern, in particular, inadequate resistance to sulfuric acid and to xylene and in the cation-anion test.

However, attempts to raise the reactivity of the binder by increasing the ratio of the number of acid and/or anhydride groups to the number of epoxy groups in the glycidyl esters, in a procedure according to the above-mentioned patent applications, lead to products of increased solution viscosity, which are therefore no longer high-solids products. This also occurs in the case of corresponding products which have tert-butyl groups in the polymer. As is known, the tert-butyl group may be oxidized during or after the polymerization to give an acid group.

These higher solution viscosities can apparently be attributed to the increased possibility for the formation of both inter- and intramolecular hydrogen bonds (secondary bonding forces), owing to the simultaneous presence of high amounts of hydroxyl and acid groups in the copolymer. In addition, esterification and/or transesterification reactions under these polymerization conditions may also contribute to the high solution viscosities of the hydroxyl- and carboxyl-containing copolymers.

The content of excess free acid and/or anhydride groups in the copolymer is therefore limited in the preparation of high-solids binders in accordance with the above-mentioned patent applications.

SUMMARY OF THE INVENTION

It is thus an object of the present invention to provide coating materials which overcome the above-mentioned disadvantages.

It is also an object of the invention to provide copolymers and methods of making them, which can be used to provide such coating material.

Surprisingly it has now been found by the present inventors that, in the case of those hydroxyl-containing copolymers which also contain sterically hindered monomers, even a large excess of the number of acid and/or anhydride groups over the number of epoxy groups in the glycidyl ester does not lead to a drastic rise in the solution viscosity. These copolymers are therefore ideally suited as high-solids binders having the desired enhanced drying properties in automotive refinishing at slightly elevated or room temperature. It is thus also possible, for example, to force the curing of a refinish by employing heat or IR irradiation in such a way that the coated surface has lost its tack after only about 40 minutes at a drying temperature, for example, of 60° C. Furthermore, in the production-line finishing of automobiles these binders can be used to obtain clearcoats which show good resistance to sulfuric acid and xylene and in the cation-anion test.

In accordance with the present invention, there has been provided low-viscosity copolymers containing hydroxyl and carboxyl groups, obtained by reacting A) from 3 to 50% of one or more glycidyl esters of aliphatic saturated monocarboxylic acids having a tertiary or quaternary $\alpha$ carbon atom, and B) from 97 to 50% of at least two olefinically unsaturated copolymerizable monomers of which at least one contains at least one COOH group and at least one is sterically hindered, in the presence of free-radical polymerization initiators, the quantity of COOH groups in component B exceeding the quantity of epoxy groups in component A to such an extent that the resulting copolymer has an acid number of at least 15 mg of KOH/g. It is preferred to employ from 6 to 30% of component A and from 70 to 94% of components B.

In accordance with other aspects of the invention, there has been provided processes for preparing such copolymers.

There is also provided coating compositions comprising the copolymer.

Further objects, features, and advantages of the present invention will become apparent from the detailed description of preferred embodiments that follows.

DETAILED DESCRIPTION OF PREFERRED EMBODIMENT

The novel copolymers of the invention are distinguished by their simultaneously high content of hydroxyl and carboxyl and/or carboxylic anhydride groups and their extremely low viscosity.

In accordance with the present invention, there is provided copolymers preferably having an OH number of from 40 to 250 mg of KOH/g, an acid number of greater than 15 mg of KOH/g and a low solution viscosity of from 10 to 2000 mPa s (measured for a 50% strength solution at 23° C. in accordance with DIN 53018). All data in % below are contents by mass.

The resulting copolymers have high acid numbers while nevertheless possessing very low solution viscosities.

Any component A or mixtures thereof, which meet the above definition, can be used. The term "aliphatic saturated monocarboxylic acids having a tertiary or quaternary α-carbon atom" denotes compounds where the carbon atom directly adjacent to the carboxyl group is bound to 2 or 3 further carbon atoms. As component A it is preferred to use glycidyl esters of α-alkylalkanemonocarboxylic acids and/ or α,α-dialkylalkanemonocarboxylic acids, individually or in a mixture.

The compounds of A are selected, for example, from the glycidyl esters of 2,2-dimethylpropionic acid, 2,2-dimethylundecanoic acid and neo acids such as neohexanoic acid, neononanoic acid and neodecanoic acid. In this context the alkyl radicals may also possess a different number of carbon atoms.

The total number of carbon atoms in the initial monocarboxylic acids for the glycidyl ester is in general between 4 and 30 and, in particular, between 5 and 20.

Component B comprises a mixture of

B1) one or more olefinically unsaturated monomers having at least one —COOH group, and B2) one or more olefinically unsaturated, sterically hindered monomers, and, if desired, one or more of components B3 to B5, namely B3) one or more hydroxyalkyl or hydroxyaryl esters or oligomeric hydroxyalkylene glycol esters of α,β-unsaturated carboxylic acids, with aliphatic polyols selected from the group comprising alkylene diols having 2 to 30 carbon atoms and oligo-oxyalkylene glycols, B4) one or more esters of an α,β-unsaturated carboxylic acid with a monohydric aliphatic alcohol having 1 to 20 carbon atoms, and B5) one or more olefinically unsaturated compounds other than those coming under B1, B2, B3 or B4.

The compounds B1–B5 may be any within the described groups. Preferred compounds are described below.

The compounds of B1 are selected, for example, from the acidic acrylic monomers such as acrylic and methacrylic acid, maleic, fumaric and itaconic acid and the half-esters thereof, and crotonic acid, isocrotonic acid and vinylacetic acid.

In components B2 to B5 mentioned below, too, the term "α,β-unsaturated carboxylic acids" also refers to dicarboxylic acids such as, for example, maleic acid, fumaric acid and itaconic acid and to their half-esters.

The compounds of B2 include any olefinically unsaturated, sterically hindered monomers, preferably those whose homopolymers have glass transition temperatures of more than 45° C. measured at a molecular mass which is sufficiently high for there to be no longer any dependence of the glass transition temperature on the molecular mass. Sterically hindered vinyl monomers contain at least one olefinic C—C double bond and have a branched carbon chain and/or a cyclic structure. The term cyclic structure refers below to all monocyclic and polycyclic structures.

Sterically hindered, olefinically unsaturated monomers B2 suitable for the preparation of the polymers of the invention include esters of α,β-unsaturated carboxylic acids, such as acrylic acid and methacrylic acid, with sterically hindered alcohols, and/or sterically hindered vinyl monomers. The sterically hindered alcohols may be aliphatic branched or cyclic alcohols or aromatic alcohols. The sterically hindered alcohols may also feature a combination of two or more of these structural characteristics.

Suitable aliphatic branched, noncyclic esters of methacrylic acid or of acrylic acid can be prepared from these acids and from one or more branched, noncyclic, saturated or unsaturated alcohols having, for example, 3 to 30 carbon atoms and, in particular, 4 to 20 carbon atoms.

Suitable saturated alcohols include tert-butyl alcohol, tert-amyl alcohol, 2-methylbutanol 3-methylbutanol, neopentyl alcohol, 3-methyl-2-butanol, 2-pentanol, 3-pentanol, 2,3-dimethyl-2-butanol, 3,3-dimethylbutanol, 3,3-dimethyl-2-butanol, 2-ethyl-2-butanol, 2-hexanol, 3-hexanol, 2-methylpentanol, 2-methyl-2-pentanol, 2-methyl-3-pentanol, 2-methylpentanol, 3-methylpentanol, 3-methyl-3-pentanol, 4-methylpentanol, 2-methyl-2-pentanol, 2-(2'-hexyloxyethoxy)ethanol, 2,2-dimethyl-3-pentanol, 2,3-dimethyl-3-pentanol, 2,4-dimethyl-3-pentanol, 4,4-dimethyl-3-pentanol, 3-ethyl-3-pentanol, 2-heptanol, 3-heptanol, 2-methyl-2-hexanol, 2-methyl-3-hexanol, 5-methyl-2-hexanol, 2-ethylhexanol, 4-methyl-3-heptanol, 6-methyl-2-heptanol, 2-octanol, 3-octanol, 2-propylpentanol, 2,4,4-trimethylpentanol, 2,6-dimethyl-4-heptanol, 3-ethyl-2,2-dimethyl-3-pentanol, 2-nonanol, 3,5,5-trimethylpentanol, 3,5,5-trimethylhexanol, 2-decanol, 4-decanol, 3,7-dimethyloctanol, 3,7-dimethyl-3-octanol, 2-dodecanol and 2-tetradecanol. Further suitable alcohols are commercial mixtures of branched alcohols which are supplied, for example, by Exxon Chemical under the trade names Exxal® 6, Exxal® 7 to Exxal® 13. (The number after the trade name indicates the number of carbon atoms in the alcohols.)

Examples of suitable unsaturated alcohols include 1-hexen-3-ol, phytol (=3,7,11,15-tetramethyl-2-hexadecenol), 3-methyl-1-penten-3-ol, 4-methyl-3-pentenol, 2-methyl-3-butenol, 3-methyl-3-buten-2-ol, 3-methyl-2-butenol, 3-methyl-3-butenol, 1-penten-3-ol, 3-penten-2-ol, 4-penten-2-ol, 6-methyl-5-hepten-2-ol, 1-octen-3-ol, nopol (=6,6-dimethyl-2-[hydroxyethyl]-bicyclo[3.1.1]heptene-2) and oleyl alcohol.

Also suitable are esters of acrylic or methacrylic acid with cyclic aliphatic alcohols having, for example, 5 to 30 carbon atoms and, in particular, having 6 to 20 carbon atoms, examples being cyclohexanol, 4-tert-butylcyclohexanol, 3,3,5-trimethylcyclohexanol, isoborneol, 8- and 9-hydroxytricyclo[5.2.1.0$^{2,6}$]dec-3-ene (dihydrodicyclopentadienyl alcohol), 8-hydroxytricyclo[5.2.1.0$^{2,6}$]decane, 8-hydroxymethyltricyclo[5.2.1.0$^{2,1}$]decane and citronellol.

Other suitable esters of acrylic or methacrylic acid can be prepared, for example, with the following alcohols (aralkanols): trans-2-phenylcyclohexanol, 6-phenylhexanol, 3,5-bis(trifluoromethyl)benzyl alcohol, cyclopropyldiphenylmethanol, 1,1,1,3,3,3-hexafluoro-2-phenylpropan-2-ol, 2-bromo-1-indanol, 1-indanol, 2-indanol, 5-indanol, 3-chloro-1-phenylpropan-1-ol, 3,5-dimethylbenzyl alcohol, 1-phenylpropan-2-ol, 2,3-dihydro-2,2-dimethylbenzofuran-7-ol and 2-methoxyphenylethyl alcohol.

Suitable phenyl and naphthyl esters of acrylic or methacrylic acid can be prepared, for example, from one or more of the following hydroxy aromatic compounds which may also be substituted by one or more alkyl and/or alkoxy groups having one to eight carbon atoms: 2-cyclopentylphenol, 2,6-di-tert-butyl-4-methylphenol, nonylphenol, 2,4,6-tri-tert-butylphenol, 1,2,3,4-tetrahydro-1-naphthol, 5,6,7,8-tetrahydro-1-naphthol, 5,6,7,8-tetrahydro-2-naphthol, 2-sec-butylphenol, 2-tert-butylphenol, 3-sec-butylphenol, 3-tert-butylphenol, 4-sec-butylphenol, 4-tert-butylphenol, 2,3,5-trimethylphenol and 2,6-dimethylphenol.

Examples of sterically hindered vinyl monomers which are suitable for the sterically hindered copolymers of the invention include styrene, 4-phenylstyrene, vinylcyclohexane, vinylcyclooctane, vinylcyclopentane, norbornene-2, 1,4,6,8-dimethanooctahydronaphthalene, 5-vinyl-2-norbornene, limonene, tert-butylstyrene, α-methylstyrene, 4-methylstyrene, one or more of the isomeric vinyltoluenes, if desired in a mixture, vinyl esters of branched aliphatic carboxylic acids, such as vinyl 2-ethylhexanoate, 5-ethylidene-norbornene-2 and alkyl- or alkoxystyrenes having 1 to 8 carbon atoms in the alkyl or alkoxy group, which alkyl or alkoxy groups are connected to the phenyl ring.

Styrene is especially important in this context since it is an inexpensive standard monomer. It is therefore usually included as a constituent of component B2.

The hydroxyalkyl esters of B3 include half-esters of α,β-unsaturated carboxylic acids with aliphatic diols having 2 to 30, in particular 2 to 20 or 2 to 10, carbon atoms. Half-esters having a primary hydroxyl group are derived from α,ω-diols. They include, for example, hydroxyethyl acrylate, hydroxypropyl acrylate, hydroxybutyl acrylate, hydroxyamyl acrylate, neopentylglycol monoacrylate, hydroxyhexyl acrylate, hydroxyoctyl acrylate and the corresponding methacrylates. Examples of hydroxyalkyl esters having a secondary hydroxyl group which may be used are 2-hydroxypropyl acrylate, 2-hydroxybutyl acrylate, 3-hydroxybutyl acrylate and the corresponding methacrylates. It is of course also possible to employ in each case the corresponding esters of other α,β-unsaturated carboxylic acids, such as, for example, those of crotonic acid and of isocrotonic acid.

Other compounds of like suitability are reaction products of one mole of hydroxyethyl acrylate and/or hydroxyethyl methacrylate and on average two moles of ε-caprolactone. Other suitable hydroxyl-containing esters are derived from the α,β-unsaturated carboxylic acids and the oligomeric alkylene glycols, such as oligoethylene and oligopropylene glycol having molecular masses of up to 1000 g/mol. Other suitable compounds are half-esters of α,β-unsaturated monocarboxylic acids with cycloaliphatic diols such as 1,4-cyclohexanedimethanol, 3(4),8(9)-bis(hydroxymethyl) tricyclo[5.2.1.0$^{2,6}$]decane or dihydroxy aromatic compounds such as pyrocatechol, hydroquinone and bisphenol A.

The compounds of B4 include, for example, esters of α,β-unsaturated monocarboxylic acids with aliphatic, monohydric, unbranched alcohols having 1 to 20 carbon atoms, such as methyl, ethyl, butyl, hexyl, lauryl, stearyl, isopropyl and 2-amyl acrylate or methacrylate. Also suitable are esters of these alcohols with, for example, crotonic acid or isocrotonic acid. Particular preference is given to methyl and ethyl acrylate and to the corresponding methacrylates.

The compounds of B5 are selected from the group comprising halogen-substituted members of compounds B1 through B4; vinyl esters of aliphatic or aromatic acids with 2 to 18 carbon atoms; vinyl halogenides and vinylidene dihalogenides; esters of unsaturated acids other than α,β-unsaturated acids, vinyl group-containing silane compounds; amides, alkylamides, dialkylamides and nitriles of olefinically unsaturated carboxylic acids. Compounds B5 include, for example, the esters of acrylic and methacrylic acid with halogenated alcohols, for example, trifluoroethyl, pentafluoro-n-propyl and hexachlorobicycloheptenyl acrylate, the esters of halogenated acrylic acids, such as methyl 2-fluoroacrylate or dibromophenyl 2-fluoroacrylate, esters of unsaturated acids other than α,β-unsaturated acids, vinyl esters such as vinyl acetate, halogenated vinyl compounds such as vinyl chloride, vinylidene chloride and vinylidene fluoride, and halogenated aromatic vinyl compounds such as chlorostyrene. All compounds which are specified under B1 to B4 and which are additionally halogen-substituted are likewise included in this group.

Other compounds according to B5 are monomers comprising silane groups. Typical examples of these monomers are acrylatoalkoxysilanes such as γ-(meth) acryloyloxypropyltrimethoxysilane, γ-(meth) acryloyloxypropyltris(2-methoxyethoxy) silane and vinylalkoxysilanes such as vinyltrimethoxysilane, vinyltriethoxysilane and vinyltris(2-methoxyethoxy) silane. Corresponding acyloxysilanes, such as dimethoxy-acetoxyvinylsilane, are also included here.

Further exemplary compounds for B5 are also acrylamides, acrylonitrile and methacrylonitrile.

In the mixture of initial monomers, component B preferably comprises a mixture of B1) from 1 to 50%, preferably from 5 to 40%, of an α,β-unsaturated monocarboxylic acid or dicarboxylic acid, preferably acrylic or methacrylic acid, maleic, fumaric or itaconic acid or a half-ester thereof, or a mixture thereof, B2) from 1 to 85%, preferably from 3 to 80%, of an olefinically unsaturated, sterically hindered monomer, or a mixture of two or more of such monomers, B3) from 0 to 45%, preferably from 10 to 45%, of a hydroxyalkyl or hydroxyaryl ester or oligomeric hydroxyalkylene glycol ester of acrylic acid or methacrylic acid, or a mixture of two or more such esters, B4) from 0 to 60%, preferably from 1 to 55%, of an ester of acrylic or methacrylic acid with a monohydric aliphatic alcohol, or a mixture of two or more such esters, and B5) from 0 to 60%, preferably from 1 to 55%, of at least one olefinically unsaturated compound, as described above, the sum always being 100% of the total mass of components B, and the sum of the proportions by mass of the esters preferably being not more than 90%.

Particularly suitable monomers are

B1) acrylic acid, methacrylic acid, maleic acid and fumaric acid,

B2) tert-butyl, cyclohexyl, 4-tert-butylcyclohexyl, 3,3,5-trimethylcyclohexyl, isobornyl and dihydrodicyclopentadienyl esters of acrylic and methacrylic acid, styrene and α-methylstyrene, B3) hydroxyethyl, hydroxypropyl and hydroxybutyl esters of acrylic and methacrylic acid, oligomeric propylene glycol esters of acrylic and of methacrylic acid, B4) methyl, ethyl, butyl, pentyl, hexyl, lauryl, and stearyl esters of acrylic and methacrylic acids, and B5) fluorinated and chlorinated acrylic esters, fluorinated and chlorinated aromatic vinyl compounds and monomers which comprise silane groups.

During the polymerization reaction, the acidic monomers and the glycidyl ester which was introduced as initial charge form a reaction product which is present in the copolymer of the invention, in general, in a proportion by mass of from 6 to 60%, preferably from 10 to 55%. The reaction between epoxy and carboxy functional compounds may be catalysed or non-catalysed. Suitable catalysts include alkaline and alkaline earth metal salts, such as Na-, Li-, K-, Ca-, Sr-salts, and salts of transition metals, such as Ti, V, Zr and Mn.

The excess proportions of acidic monomers then lead to a high acid content in the copolymer. This results in an acid number of greater than 15 mg of KOH/g in the copolymer.

Suitable polymerization initiators for preparing the copolymers of the invention include any of the conventional free radical-forming compounds, individually or in a mixture. Examples of such compounds are aliphatic azo compounds, diacyl peroxides, peroxy-dicarbonates, alkyl per-esters, alkyl hydroperoxides, perketals, dialkyl peroxides or ketone peroxides. Dialkyl peroxides such as di-t-butyl peroxide or di-t-amyl peroxide and alkyl per-esters such as t-butyl peroxy-2-ethylhexanoate or t-amyl peroxy-2-ethylhexanoate are preferred. The proportion of initiators may be, for example, from 0.5 to 5%, preferably up to 4% and, in particular, up to 3%, based on the total mass of the starting components.

The polymerization is preferably carried out in bulk (as a mass polymerization at the end of polymerization). The term "bulk polymerization" refers to a polymerization which is generally carried out without solvent. In some cases, however, the presence of a small proportion of solvent, namely up to 20%, preferably up to 10% and, in particular, up to 5%, based on the mass of the starting components, is also possible. In this case it is possible to carry out polymerization under increased pressure. However, working without solvent is preferred.

The polymerization may be carried out in any desired manner, for example, it can be carried out in such a way that all components A and B are reacted in unison together with one or more free-radical initiators, with the ester formation and the polymerization taking place simultaneously alongside one another. An alternative procedure comprises initially charging component A, the glycidyl ester, and reacting it conventionally at from 100° to 210° C. with components B and at least one free-radical initiator in a bulk polymerization until a degree of reaction of at least 95%, preferably at least 96%, has been reached. A third route in accordance with the invention is the polymerization of at least one component from group B in the first step, with the addition in the second step of further (or, if appropriate, another) initiator, the remaining quantity of components B, and component A. This process makes it possible to carry out the polymerization and the esterification at different temperatures. The fourth route in accordance with the invention is the reaction of the polymer formed in the first stage, if desired in solution, with component A in a second stage. Depending on the parameters of the monomers involved, one of the proposed procedures may be more favorable than others.

The processes according to the invention can be carried out batchwise (in a so-called batch process) or continuously. In the multistage processes one option is an embodiment in which the respective reaction stages are carried out in separate vessels. It is likewise possible to carry out the reaction in the first stage continuously and that of the second stage in a batchwise procedure.

The copolymers prepared, containing hydroxyl, carboxyl and/or carboxylic anhydride groups, can be further modified in a subsequent stage, for example, by reacting them with isocyanate compounds which contain per molecule on average from 0.8 to 1.5 free NCO groups and at least one tertiary amino group. In this case the solvent employed in the polymerization, i.e., in the preparation of the polymers, must of course be inert with respect to these isocyanate compounds.

These isocyanate compounds also include, for example, all low molecular weight urea derivatives which, in the paint industry, lead to "sag controlled" acrylate resins.

The copolymers according to the invention can be identified by their OH group content, which in general leads to an OH number of from 40 to 250 mg, preferably from 70 to 200 mg and, in particular, from 80 to 180 mg of KOH/g, and by their acid group content, which generally leads to an acid number of greater than 15 mg, preferably from 18 to 50 mg and, in particular, from 21 to 35 mg of KOH/g.

The polymers of the invention possess, moreover, a particularly low solution viscosity. It is generally in the range from 10 to 2000 mPa s, preferably from 15 to 500 mPa s and, in particular, from 20 to 150 mPa s, measured for a 50% strength solution in butyl acetate at 23° C. in accordance with DIN 53018. The polymers typically possess average molecular masses (number-average) of less than 5000 g/mol, preferably from 300 to 4500 g/mol and, in particular, from 500 to 4000 g/mol.

Examples of suitable solvents for the products obtained in accordance with the invention are aliphatic, cycloaliphatic and/or aromatic hydrocarbons, such as alkyl benzenes, for example, xylene or toluene; esters, such as ethyl acetate, butyl acetate, acetates with longer alcohol residues, butyl propionate, pentyl propionate, ethylene glycol monoethyl ether acetate or the corresponding methyl ether acetate; ethers, such as ethylene glycol acetate monoethyl, methyl or butyl ether; glycols; alcohols; ketones, such as methyl amyl ketone or methyl isobutyl ketone; lactones or the like, or mixtures of such solvents.

The present invention furthermore relates to coating compositions which comprise as binder component the hydroxyl- and carboxyl-containing copolymers according to the invention. The copolymers may be cured in the presence of any suitable crosslinking agents without heat or at elevated temperature. The copolymers of the invention are particularly suitable for coatings, especially for coatings-related applications in 2-component and 1-component systems, especially for so-called high-solids systems, in other words for solvent-containing mixtures having a high solids content, in automotive refinishing and the production-line finishing of automobiles.

In addition, the copolymers of the invention are highly suitable for pigmented topcoats and for fillers.

Suitable curing components in these coating compositions include reaction products of formaldehyde with amino resin formers such as urea, alkyleneureas, melamine and guanamines, or ethers thereof, optionally with lower alcohols having 1 to 8 carbon atoms such as methanol or butanol, and also polyisocyanates and anhydride-containing compounds, individually or in combination. The crosslinking agent is in each case added in a quantity such that the molar ratio of the OH groups of the copolymer to the reactive groups of the crosslinking agent is between 0.3:1 and 3:1.

Formaldehyde adducts which are suitable as the curing component are preferably those derived from urea, melamine and benzoguanmine, and also the completely or partially etherified formaldehyde-amine adducts. Particular preference is given to melamine-formaldehyde adducts, as curing agents, which are partially or completely etherified with aliphatic alcohols having 1 to 4 carbon atoms. Examples of such commercially available curing agents are Maprenal® MF 900 and VMF 3926 (Cassella AG) and Cymel® 303 and 327 (Cytec). Suitable mixing proportions are in the range from 50 to 90 parts of copolymer to from 50 to 10 parts of amine-formaldehyde adduct, based on solid resin.

Suitable formaldehyde-phenol adducts and derivatives thereof may also be employed as curing agents.

In the presence of acids such as p-toluenesulfonic acid, these crosslinking agents lead to full curing of the coating. Hot curing can be carried out in a conventional manner at temperatures of from 80° to 200° C. in, for example, from 10 to 30 minutes.

Polyisocyanates are suitable for curing the products according to the invention, accompanied by crosslinking, especially at moderate temperatures or at room temperature. Suitable polyisocyanate components are, in principle, all aliphatic, cycloaliphatic or aromatic polyisocyanates which are known from polyurethane chemistry, alone or in mixtures. Those which are particularly suitable are low molecular weight polyisocyanates such as, for example, hexamethylene diisocyanate, 2,2,4- and/or 2,4,4-trimethyl-1,6-hexamethylene diisocyanate, dodecamethylene diisocyanate, tetramethyl-p-xylylene diisocyanate, 1,4-diisocyanatocyclohexane, 1-isocyanato-3,3,5-trimethyl-5-isocyanatomethylcyclohexane (IPDI), 2,4'- and/or 4,4'-diisocyanatodicyclohexylmethane, 2,4'- and/or 4,4'-diisocyanatodiphenylmethane or mixtures of these isomers with their higher homologs, as are accessible in a manner known per se by phosgenization of aniline-formaldehyde condensation products, and 2,4- and/or 2,6-diisocyanatotoluene or any desired mixtures of such compounds.

However, it is preferred to employ derivatives of these simple polyisocyanates, as are conventional in coatings technology. These include polyisocyanates which contain, for example, biuret groups, uretdione groups, isocyanurate groups, urethane groups, carbodiimide groups or allophanate groups, as are described, for example, in EP 0 470 461, which is hereby incorporated by reference. The particularly preferred modified polyisocyanates include N,N',N"-tris(6-isocyanatohexyl)biuret and its mixtures with its higher homologs, as well as N,N',N"-tris(6-isocyanatohexyl) isocyanurate and its mixtures with its higher homologs containing more than one isocyanurate ring.

The crosslinking can be catalyzed by adding an organometallic compound, such as tin compounds and, if desired, tertiary amines, preferably diethylethanolamine. Examples of appropriate tin compounds are dibutyltin dilaurate, dibutyltin diacetate and dibutyloxotin.

Compounds suitable for curing at elevated temperature, in addition, include blocked polyisocyanates, polycarboxylic acids and their anhydrides.

The copolymers according to the invention are particularly suitable for the production of high-solids, solvent-containing clearcoats. High-solids coating materials are solutions having a solids content of at least 50%, preferably of more than 55%, and particularly preferably of more than 60%, by weight.

In addition, they are well suited to producing powder coatings. They can also be employed as curing agents for various synthetic resins, especially epoxy resins and dispersions of these resins.

In coating compositions produced using the copolymers according to the invention it is also possible for other auxiliaries and additives, conventional in coating technology, to be present, which have not been mentioned hitherto. These include, in particular, catalysts, leveling agents, silicone oils, plasticizers such as phosphates and phthalates, pigments such as iron oxides, lead oxides, lead silicates, titanium dioxide, barium sulfate, zinc sulfide and phthalocyanine complexes, fillers such as talc, mica, kaoline, chalk, ground quartz, ground asbestos, ground slate, various silicic acids and silicates, viscosity-controlling additives, flatting agents, UV absorbers, light stabilizers, antioxidants, peroxide-decomposing additives, antifoams, wetting agents and active diluents-reactive diluents.

The coating compositions can be applied to any desired substrate by any desired methods, for example, by brushing, dipping, flow coating or using rollers or blades, but in particular by spraying. It is also possible to apply the coating compositions at elevated pressure and temperature, in some instances dissolved in supercritical $CO_2$. Automotive refinishes having excellent properties can be obtained with binders produced using the copolymers of the invention. These binders can be employed for the preparation of both intermediate coats and pigmented or nonpigmented topcoats. Express reference is to be made to the preferential suitability of these binder combinations in two-component automotive refinishes and industrial coatings.

For this purpose the coatings are generally cured within the temperature range from −20° to +100° C., preferably from −10° to +80° C.

Using these coating compositions it is also possible to apply automotive production-line clearcoats by the basecoat/clearcoat process, these clearcoats having excellent properties. These clearcoats are particularly notable for their good resistance to sulfuric acid and xylene and in the cation-anion test, as well as by their high degrees of hardness. Express reference is to be made to the preferential suitability of these binder combinations in 1-component automotive production-line finishes.

For this purpose the coatings are generally baked within the temperature range from +80° to +200° C., preferably from +90° to +170° C.

The invention is illustrated in more detail in the examples which follow. The examples are for illustration purposes and do not limit the invention. All percentages are contents by mass and all parts are parts by mass (weight), unless expressly stated otherwise.

EXAMPLES

I. Preparation of the copolymers

In a reactor fitted with a stirrer, inert gas inlet, a heating and cooling system and a feed device, the glycidyl ester of an α,α-dialkylalkanemonocarboxylic acid [e.q., glycidyl ester of Versatic 10 or 5 acid (trade name: Cardura® E 10 or, respectively, Cardura® E 5, Shell Chemicals)](in some cases in solvent or solvent mixtures) is initially charged and heated to the desired temperature under inert gas. Subsequently, over a period of 6 hours the monomer mixture according to Table 1 (in some cases in solvent or solvent mixtures) is metered in at a uniform rate, together or separately, with initiator or initiator mixtures (in some cases in solvent or solvent mixtures). Polymerization is subsequently carried out for 2 hours until a conversion of at least 95% has been reached.

If the solids content after polymerization is below 97.5%, then the batch is re-primed, either before or during the after polymerization, with 1/10 of the initial quantity of initiator (with or without solvent), or the residual monomers (including fragments of initiator/solvent) are separated off in a vacuum distillation.

The copolymers are dissolved in suitable solvents or solvent mixtures.

All copolymers are filtered through a suitable filtering device. The precise batches for the preparation of the copolymers, in terms of parts by weight, reaction conditions and product characteristics, can be taken from the table which follows.

TABLE 1

Preparation and properties of copolymers

| Batch | Copolymer 1 | Copolymer 2 | Copolymer 3 | Copolymer 4 |
|---|---|---|---|---|
| Glycidyl ester (Cardura ® E10) | 24.18 | 22.45 | 22.69 | 11.43 |
| Acrylic acid | 3.54 | — | 3.63 | 1.83 |
| Methacrylic acid | 7.69 | 10.72 | 7.37 | 4.40 |
| Hydroxyethyl methacrylate | 19.85 | 18.05 | 18.94 | 25.29 |
| Polypropylene glycol (n = 5 or 6) monomethacrylate | — | 0.95 (n = 5) | 0.95 (n = 5) | 0.95 (n = 6) |
| Isobornyl methacrylate | 14.89 | 10.07 | — | — |
| Isobornyl acrylate | — | — | 10.32 | — |
| 4-tert-butylcyclohexyl methacrylate | — | — | — | 14.93 |
| Methyl methacrylate | 7.18 | 4.82 | 12.82 | 6.66 |
| Styrene | 22.67 | 32.94 | 23.28 | 34.51 |
| Initiator | DTAP | DTAP | DTAP | DTAP |
| Parts | 1.50 | 1.50 | 1.50 | 1.50 |
| Polymerization temperature (°C.) | 170 | 175 | 175 | 180 |
| SC (%) after polymerization | 97.2 | 98.1 | 97.8 | 96.9 |
| after distillation | 98.4 | — | — | 98.1 |
| SC (%) sf. (in butyl acetate) | 70.1 | 70.4 | 69.9 | 70.2 |
| Acid number (mg of KOH/g SR) | 22.3 | 23.3 | 25.7 | 32.1 |
| Hydroxyl number (mg of KOH/g SR) | 134.8 | 136.0 | 142.8 | 143.2 |
| Viscosity (mPA s), 23° C. (sf.) | 3280 | 5860 | 8410 | 6230 |
| Viscosity (mPa s), 23° C. (50% strength in BuAc) | 51 | 58 | 61 | 52 |
| GPC (PS calibration) | | | | |
| $<Mw>$ (g/mol) | 3800 | 4380 | 4510 | 3270 |
| $<Mn>$ (g/mol) | 1780 | 2160 | 9100 | 1490 |
| U = $<Mw>/<Mn>$ | 2.1 | 2.0 | 2.2 | 2.2 |
| Hazen color number (DIN 53995) | 51 | 36 | 42 | 63 |
| $T_g$ (DSC measurement, °C.) | 24 | 23 | 26 | 22 |
| Appearance | transparent | transparent | transparent | transparent |

SC: Solids content by mass
SR: Solid resin
sf.: Supply form
n: Average degree of polymerization of the polypropylene glycol
$T_g$: Glass transition temperature of the solid resin, Perkin Elmer DSC-7, 10 K/min
Initiator:
DTAP: Di-tert-amyl peroxide: (Interox ® DTAP; Peroxid Chemie)
GPC: $<Mw>$, $<Mn>$ Millipore ® Waters Chromatography System 860
Pump: Model 590 RI detector: Model 410
Column packing: Waters Utrastyragel 2 × LINEAR + 1 × 500 Å
Solvent: Tetrahydrofuran at 40° C.
Flow rate: 1 ml/min, concentration: 1% strength based on solids content
Calibration: Polystyrene (from PSS, Mainz)
Determination of characteristics: Acid number, hydroxyl number and viscosity (for standards see "Analytische Bestimmungsmethoden" [Analytical determination methods], brochure; Kunstharze Hoechst, 1992 edition; Hoechst AG, Frankfurt/Main)
Hazen color number in accordance with DIN 53995 (LTM1, Dr. Lange GmbH, Berlin)
Copolymers 1 to 4 prepared have very low average molar masses (number-average) and very low solution viscosities (Ubbelohde: 50% strength in BuAc at 23° C.).
The glass transition temperatures are above room temperature (20° C.).

II. Preparation of the coating materials

1. Automotive refinishes (2-component coating materials)

In order to prepare the curable coating compositions according to the invention the components—comprising a copolymer or a mixture of two or more of such copolymers or other copolymers as binders, with the auxiliaries and additives, solvents and crosslinking agents in the mixing ratio described (Table 2)—are mixed and are adjusted using further diluent to the spray viscosity of from 20 to 21 seconds with a flow cup (DIN 52 211, 4 mm, 23° C.). For components of low viscosity this can be carried out in bulk, with heating to higher temperatures being carried out if desired. Products of higher viscosity are dissolved or dispersed, prior to mixing, in the diluents mentioned, unless the curable mixtures are to be employed as a powder coating. In the case of pigmented systems a pigment paste is first of all produced in one dispersion step from the corresponding pigments together with the copolymer or with a mixture of two or more such or other copolymers, or an appropriate, specific grinding resin, in a dispersion apparatus of suitable construction. This paste is mixed and is made up with the addition of further diluents or additives typical for coatings. If desired, further binder based on the copolymers according to the invention, or a different resin which is compatible with the other components of the coating system, can be admixed. The pot life and the properties of the resulting films depend in this context on the process conditions, in other words on the nature and quantity of the starting materials, the metering of the catalyst, the temperature regime, etc. Although curing is generally carried out discontinuously, it is also within the scope of the invention to mix the components and carry out the reaction continuously, for example, using an automatic coating apparatus.

TABLE 2

Preparation of the high-solids (automotive refinish) clearcoats

| Batch | Copolymers | | | |
|---|---|---|---|---|
| | 1 | 2 | 3 | 4 |
| Appearance | trans-parent | trans-parent | trans-parent | trans-parent |
| SC % | 70.1 | 70.4 | 69.9 | 70.2 |
| OH number/% OH | 135/4.1 | 136/4.1 | 143/4.3 | 143/43 |
| Visc. mPa s (50%) | 51 | 58 | 61 | 52 |
| Binder | 82 | 82 | 82 | 82 |
| Tinuvin ® 292 | 0.5 | 0.5 | 0.5 | 0.5 |
| Tinuvin ® 1130 | 1.5 | 1.5 | 1.5 | 1.5 |
| Si oil LO 50%, 10% strength | 1 | 1 | 1 | 1 |
| Solvesso ® 100 | 1.5 | 1.5 | 1.5 | 1.5 |
| Xylene | 2.5 | 2.5 | 2.5 | 2.5 |
| BuAc | 11 | 11 | 11 | 11 |
| Desmodur ® N 3390 | 29.5 | 29.9 | 31.4 | 31.4 |
| Flow cup (DIN 53 211) (seconds) | 21 | 21 | 21 | 21 |
| Coating designation | Coating material 1 | Coating material 2 | Coating material 3 | Coating material 4 |

Tinuvin ® 292: "HALS" (Ciba Geigy, Basel)
Tinuvin ® 1130: UV absorber (Ciba Geigy, Basel)
Si oil LO 50%: levelling agent silicone oil (Wacker Chemie GmbH, Burghausen)
Desmodur ® N 3390: isocyanurate-containing polyisocyanate (Bayer AG, Leverkusen)
BuAc: butyl acetate
Solvesso ® 100: mixture of branched aliphatic hydrocarbons of medium boiling range 2. Automotive production-line finishes (1-component coating materials)

Preparation of a solvent-containing clearcoat according to the invention 30.0 parts by weight of a 75% strength solution of a commercial, highly reactive melamine-formaldehyde resin in isobutanol (Maprenal®VMF 3926), 0.75 part by weight of a UV absorber of the benzotriazole type (Tinuvin® 1130, 100%) and 0.75 part by weight of a free-radical scavenger of the HALS type (Tinuvin® 292,100%) are added with stirring to about 75 parts by weight of the acrylate resin binder containing copolymer 1, and the components are mixed thoroughly.

The mixture is diluted, while stirring is continued, with a mixture of 7.5 parts by weight of isobutanol, 7.5 parts by weight of Solvesso® 150 and 7.5 parts by weight of butylglycol.

The clearcoat is then adjusted to an application viscosity of 25 seconds with a flow cup (DIN 53 211, 4 mm, 23° C.) with 19.0 parts by weight of a solvent mixture comprising 20 parts of Solvesso® 100, 10 parts of xylene and 10 parts of methoxypropyl acetate.

0.15 part by weight of a slip additive (Additol® XL 121, 0.1% based on overall coating material) is subsequently admixed with stirring to the coating material.

The resulting clearcoat ultimately has an application solids content of 54.0% by weight (measured in accordance with DIN 53 216/1 h, 120° C.).

Maprenal® VMF 3926 highly reactive melamine-formaldehyde resin in isobutanol (Cassella AG, Offenbach)
Tinuvin® 292 "HALS" (Ciba Geigy, Basel)
Tinuvin® 1130 UV absorber (Ciba Geigy, Basel)
Additol® XL 121 "Slip" additive (Hoechst AG, Frankfurt/Main)

III. Performance testing 1. a) Performance testing of high-solids 2-component clearcoats (automotive refinish)

The coating systems described in II.1. were applied to cleaned glass panels using 100 μm doctor blades and were tested under the conditions of air drying and forced drying (45 minutes at 60° C.) (Table 3).

TABLE 3

Performance testing of high-solids clearcoats (automotive refinish)

| Coating designation | Coating material 1 | Coating material 2 | Coating material 3 | Coating material 4 |
|---|---|---|---|---|
| Appearance initial/pot life | transparent 6 h/8 h gel. | transparent 6 h/8 h gel. | transparent 6 h/8 h gel. | transparent 6 h/8 h gel |
| Dust-dry time | 6' | 8' | 7' | 7' |
| Tack-free drying | 2 h | 1.5 h | 1.5 h | 1.5 h |
| SC-1 h 125° C. (%) | 61.5 | 60.7 | 605 | 613 |
| Pendulum hardness after | | | | |
| 4 h | 101 | 96 | 102 | 91 |
| 2 d | 134 | 141 | 151 | 143 |
| 5 d | 197 | 188 | 198 | 178 |
| 10 d | 221 | 205 | 202 | 199 |
| Premium-grade gasoline after 10 d in Min. | >30' | >30' | >30' | >20' |
| Pendulum hardness after 45' 60° C. drying | | | | |
| 24 h | 166 | 171 | 181 | 175 |
| 2 d | 203 | 201 | 192 | 188 |
| 5 d | 219 | 208 | 199 | 196 |
| 45' 60° C. drying Premium-grade gasoline after 5 d in Min. | >30' | >30' | >30' | >25' |

Pendulum hardnesses in accordance with König
SC: Solids content by mass in accordance with DIN 53 216
d: days
h: hours
': minutes
gel.: gelled Summary:

The coating compositions according to the invention, uncatalyzed in clearcoats formulated as in practice, have very high solids contents of coating material, very high film hardnesses and resistances, with a very high drying rate and very rapid through-drying (increase in reactivity).

The topcoat appearance matches the properties of the standard systems.

Standard systems: high-solids binder Macrynal® SM 515, Macrynal® SM 516 from Hoechst AG, Frankfurt/Main b) Hot adhesion test (simulation: IR irradiation)

Coating material 1 was applied to a standard metallic basecoat with 1.5 spray passes and was tested for tack (in an oven) after various times in comparison with a corresponding standard coating material (base: binder without high acid content) with storage in an oven (60° C.)—"IR irradiation".

| Hot adhesion test | Coating material 1 | Standard |
| --- | --- | --- |
| 30' 60° C. | 1–2 | 5 |
| 40' 60° C. | 1 | 4–5 |

0 = best value
5 = worst value

Summary:

The curing reaction for a refinish is forced by the coating compositions according to the invention in such a way that the surface is free from tack after 40 minutes following drying at 60° C.

2. Performance testing of high-solids 1-component clearcoats (automotive production-line coating materials)

The clearcoat prepared as described in II.2. and a commercial 1-component automotive production-line clearcoat which is also tested, as comparison material (application solids content: 46.0% by weight, measured in accordance with DIN 53 216/1 h, 120° C.; application viscosity: 25 seconds, measured in accordance with DIN 53 211, 4 mm, 23° C.) are applied, after deaeration, in a wet-film thickness of 150 μm to metal gradient panels (special deep-drawn material with RP surface according to DIN 1624) and are baked for 20 minutes in a gradient oven at from 100 to 160° C.

The clear and high-gloss coatings obtained in this way were tested. The test results are summarized in the table below.

| Test conditions: 30 min. at | 50° C. | 60° C. | 70° C. | 80° C. |
| --- | --- | --- | --- | --- |
| Sulfuric acid resistance (10%) | | | | |
| Clearcoat of the invention | 0 | 1–2 | 2/mark | 2–3/v.s. mark |
| Commercial automotive production-line clearcoat | 0 | 2/sl. mark | 3/mark | 5/v.s. mark |
| Cation-anion test | | | | |
| Clearcoat of the invention | 0 | 1 | 2/sl. mark | 2–3/s. mark |
| Commercial automotive production-line clearcoat | | | | |

1) Visual assessment:
0 = best value
5 = worst value
sl. mark = slight mark
s. mark = severe mark
v.s. mark = very severe mark Summary:

The experiments described above show that the use of the acrylate resin binder of the invention in the formulation of 1-component automotive clearcoats leads to relatively high-solids clearcoats which are highly reactive even in the lower baking range (see pendulum hardness).

| Baking conditions: 20 min at | 100° C. | 110° C. | 120° C. | 130° C. | 140° C. | 150° C. | 160° C. |
| --- | --- | --- | --- | --- | --- | --- | --- |
| König pendulum hardness | | | | | | | |
| Clearcoat of the invention | 141 s | 195 s | 205 s | 207 s | 203 s | 202 s | 203 s |
| Commercial automotive production-line clearcoat | 72 s | 102 s | 144 & | 158 s | 160 s | 162 s | 162 s |
| Erichsen indentation | | | | | | | |
| Clearcoat of the invention | n.m. | n.m. | n.m. | 5.9 mm | 5.4 mm | 2.6 mm | 2.4 mm |
| Commercial automotive production-line clearcoat | n.m. | n.m. | n.m. | 7.5 mm | 6.9 mm | 6.8 mm | 5.9 mm |
| Xylene resistance | | | | | | | |
| Clearcoat of the invention | <1 min. | <2 min. | >5 <10 min. | >60 min. | >60 min. | >60 min. | >60 min. |
| Commercial automotive production-line clearcoat | <1 min. | <3 min. | >5 <10 min. | >5 <10 min. | >5 <10 min. | >10 <15 min. | >10 <15 min. | n.m. = not measured

To test for resistance to sulfuric acid (10% by weight), cations ($NH_4^+$, $Ca^{2+}$, $Na^+$, $K^+$) and anions ($Cl^-$, $NO_3^-$, $SO_4^{2-}$) the clearcoats are applied in a wet-film thickness of 150 μm to metal gradient panels (special deep-drawn material with RP surface according to DIN 1624) and are baked for 20 minutes at 140° C.

The coated panels are then heated in a gradient oven at temperatures of from 50° C. to 80° C.

To test for resistance properties the clearcoat films are exposed in a gradient oven at from 50° C. to 80° C. for 30 minutes to the appropriate reagents. These reagents are then washed off with water and the paint films are carefully dried using a soft cloth and evaluated visually[1]). The test results are summarized in the table below.

The resistances to xylene and sulfuric acid of the coating composition according to the invention, compared with the automotive production-line clearcoat employed, are outstanding.

While the invention has been described with reference to certain preferred embodiments, numerous modifications, alterations, and changes to the preferred embodiments are possible without departing from the spirit and scope of the invention.

What is claimed is:

1. A low-viscosity copolymer containing hydroxyl and carboxyl groups which is obtained by reacting in the absence of solvents
    A) from 3 to 50% by weight of one or more glycidyl esters of aliphatic saturated monocarboxylic acids having a tertiary or quaternary α carbon atom, and
    B) from 97 to 50% by weight of at least two olefinically unsaturated copolymerizable monomers of which at least one contains at least one COOH group and at least one is sterically hindered, wherein the sterically hindered monomer comprises one or more esters of acrylic or methacrylic acid with one or more branched or cyclic monohydric aliphatic alcohols, wherein the monohydric alcohol is selected from the group consisting of tert-butyl alcohol, tert-amyl alcohol, 2-methylbutanol 3-methylbutanol, neopentyl alcohol, 3-methyl-2-butanol, 2-pentanol, 3-pentanol, 2,3-dimethyl-2-butanol, 3,3-dimethylbutanol, 3,3-dimethyl-2-butanol, 2-ethyl-2-butanol, 2-hexanol, 3-hexanol, 2-methylpentanol, 2-methyl-2 -pentanol, 2-methyl-3-pentanol, 2-methylpentanol, 3-methyl-2-pentanol, 3 -methyl-3-pentanol, 4-methylpentanol, 4-methyl-2-pentanol, 2- (2'-hexyloxyethoxy) ethanol, 2,2-dimethyl-3-pentanol, 2,3-dimethyl-3-pentanol, 2,4-dimethyl-3-pentanol, 4,4-dimethyl-3-pentanol, 3-ethyl-3-pentanol, 2-heptanol, 3-heptanol, 2-methyl-2-hexanol, 2-methyl-3-hexanol, 5-methyl-2-hexanol, 2-ethylhexanol, 4-methyl-3-heptanol, 6-methyl-2-heptanol, 2-octanol, 3-octanol, 2-propylpentanol, 2,4,4-trimethylpentanol, 2,6-dimethyl-4-heptanol, 3-ethyl-2,2-dimethyl-3-pentanol, 2-nonanol, 3,5,5-trimethylpentanol, 3,5,5-trimethylhexanol, 2-decanol, 4-decanol, 3,7-dimethyloctanol, 3,7-dimethyl-3-octanol, 2-dodecanol, 2-tetradecanol, 1-hexen-3-ol, phytol, 3-methyl-1-penten-3-ol, 4-methyl-3-pentenol, 2-methyl-3-butenol, 3-methyl-3-buten-2-ol, 3-methyl-2-butenol, 3-methyl-3-butenol, 1-penten-3-ol, 3-penten-2-ol, 4-penten-2-ol, 6-methyl-5-hepten-2-ol, 1-octen-3-ol, nopol, oleyl alcohol, 4-tert-butylcyclohexanol, 3,3,5-trimethylcyclohexanol, isoborneol, 8-and 9-hydroxytricyclo $(5.2.1.0^{2,6})$dec-3-ene (dihydrodicyclopentadienyl alcohol), 8-hydroxytricyclo $(5.2.1.0^{2,6})$decane, 8-hydroxymethyltricyclo $(5.2.1.0^{2,1})$ decane, and citronellol, in the presence of free-radical polymerization initiators, wherein the quantity of COOH groups in component B exceeds the quantity of epoxy groups in component A to such an extent that the resulting copolymer has an acid number of at least 15 mg of KOH/g, and wherein the viscosity of a 50% strength solution in butyl acetate at 23 ° C. does not exceed 2,000 mPa s.

2. A copolymer as claimed in claim 1, wherein A comprises one or more glycidyl esters of α-alkylalkane monocarboxylic acids or α,α-dialkylalkane monocarboxylic acids.

3. A copolymer as claimed in claim 1, wherein the olefinically unsaturated monomers of B comprise a mixture of B1) one or more olefinically unsaturated monomers having at least one —COOH group, and B2) one or more of the olefinically unsaturated, sterically hindered monomers, and, optionally, one or more of components B3 to B5, B3) one or more hydroxyalkyl or hydroxyaryl esters or oligomeric hydroxyalkylene glycol esters of α,β-unsaturated carboxylic acids with aliphatic polyols selected from the group consisting of alkylenediols having from 2 to 30 carbon atoms and of oligo-oxyalkylene glycols, B4) one or more esters of an α,β-unsaturated carboxylic acid with a monohydric aliphatic alcohol having 1 to 20 carbon atoms, and B5) one or more olefinically unsaturated compounds other than those used as B1, B2, B3 or B4.

4. A copolymer as claimed in claim 3, wherein sterically hindered monomers B2 additionally comprises styrene.

5. A copolymer as claimed in claim 1, which has an OH number of from 40 to 250 mg of KOH/g, an acid number of greater than 15 mg of KOH/g and a solution viscosity of from 10 to 2000 mPa s (measured in 50% strength solution at 23° C.).

6. A copolymer as claimed in claim 1, which has a number average molecular weight of from 300 to 5000 g/mol.

7. A copolymer as claimed in claim 3, wherein B comprises one or more of monomers B3.

8. A copolymer as claimed in claim 3, wherein B comprises one or more of monomers B4.

9. A process for the preparation of a copolymer as claimed in claim 1, which comprises subjecting component A and components B and one or more free-radical initiators to conjoint polymerization.

10. A copolymer as claimed in claim 1, which is prepared by a process which comprises introducing component A as initial charge in the reaction, then adding components B and one or more free-radical initiators, together or separately, in bulk, and subjecting the resulting mixture to conjoint polymerization.

11. A copolymer as claimed in claim 1, which is prepared by a process which comprises introducing as initial charge one or more components selected from the group B and an initiator in the reaction, then adding the remaining components B, component A and one or more free-radical initiators, together or separately, in bulk, and subjecting the resulting mixture to conjoint polymerization.

12. A copolymer as claimed in claim 1, which is prepared by a process which comprises first of all polymerizing components B with the addition of one or more free-radical initiators and then carrying out the reaction with component A.

13. A coating composition comprising a copolymer as claimed in claim 1.

14. A copolymer as claimed in claim 1, wherein the acid number is from 18 to 50 mg of KOH/g.

15. A copolymer as claimed in claim 1, wherein the acid number is from 21 to 35 mg of KOH/g.

16. A copolymer as claimed in claim 1, wherein the viscosity is from 10 to 150 mPa s.

17. A process as claimed in claim 9, wherein the polymerization is conducted in bulk in the absence of solvents.

18. A coating composition as claimed in claim 13, which is a high solids coating composition comprising at least 50% by weight solids.

19. A copolymer as claimed in claim 1, wherein the sterically hindered monomer comprises one or more tert.-butyl; 4-tert.-butylcyclohexyl; 3,3,5-trimethylcyclohexyl; isobornyl; or dihydrocyclopentadienyl esters of acrylic or methacrylic acid.

20. A copolymer containing hydroxyl and carboxyl groups which is obtained by reacting A) from 3 to 50% by weight of one or more glycidyl esters of aliphatic saturated monocarboxylic acids having a tertiary or quaternary α carbon atom, and B) from 97 to 50% by weight of at least two olefinically unsaturated copolymerizable monomers of which at least one contains at least one COOH group and at least one is sterically hindered, wherein the sterically hindered monomer comprises one or more esters of acrylic or methacrylic acid with one or more monohydric alcohols, in the presence of free-radical polymerization initiators, wherein the quantity of COOH groups in component B exceeds the quantity of epoxy groups in component A to such an extent that the resulting copolymer has an acid number of at least 15 mg of KOH/g, and wherein the viscosity of a 50% strength solution in butyl acetate at 23° C. does not exceed 2,000 mPa s, wherein the monohydric alcohol is selected from the group consisting of aralkanols, phenols, and naphthols.

21. A low-viscosity copolymer containing hydroxyl and carboxyl groups which is obtained by reacting A) from 3 to 50% by weight of one or more glycidyl esters of aliphatic saturated monocarboxylic acids having a tertiary or quaternary α carbon atom, and B) from 97 to 50% by weight of at least two olefinically unsaturated copolymerizable monomers of which at least one contains at least one COOH group and at least one is sterically hindered, wherein the sterically hindered monomer comprises one or more esters of acrylic or methacrylic acid with one or more monohydric alcohols selected from the group consisting of branched, saturated or unsaturated, non-cyclic alcohols, in the presence of free-radical polymerization initiators, wherein the quantity of COOH groups in component B exceeds the quantity of epoxy groups in component A to such an extent that the resulting copolymer has an acid number of at least 15 mg of KOH/g, and wherein the viscosity of a 50% strength solution in butyl acetate at 23 ° C does not exceed 2,000 mPa s.

22. A low-viscosity copolymer containing hydroxyl and carboxyl groups which is obtained by reacting A) from 3 to 50% by weight of one or more glycidyl esters of aliphatic saturated monocarboxylic acids having a tertiary or quaternary α carbon atom, and B) from 97 to 50% by weight of at least two olefinically unsaturated copolymerizable monomers of which at least one contains at least one COOH group and at least one is sterically hindered, wherein the sterically hindered monomer comprises one or more esters of acrylic or methacrylic acid with one or more monohydric alcohols selected from the group consisting of trans-2-phenylcyclohexanol, 6-phenylhexanol, 3,5-bis (trifluoromethyl)benzyl alcohol, cyclopropyldiphenylmethanol, 1,1,1,3,3,3-hexafluoro-2-phenylpropan-2-ol, 2-bromo-1-indanol, 1-indanol, 2-indanol, 5-indanol, 3-chloro-1-phenylpropan-1-ol, 3,5-dimethylbenzyl alcohol, 1-phenylpropan-2-ol, 2,3-dihydro-2,2-dimethylbenzofuran-7-ol, 2-methoxyphenylethyl alcohol, 2-cyclopentylphenol, 2,6-di-tert-butyl-4-methylphenol, nonylphenol, 2,4,6-tri-tert-butylphenol, 1,2,3,4-tetrahydro-1-naphthol, 5,6,7,8-tetrahydro-1-naphthol, 5,6,7,8-tetrahydro-2-naphthol, 2-sec-butylphenol, 2-tert-butylphenol, 3-sec-butylphenol, 3-tert-butylphenol, 4-sec-butylphenol, 4-tert-butylphenol, 2,3,5-trimethylphenol, and 2,6-dimethylphenol, in the presence of free-radical polymerization initiators, wherein the quantity of COOH groups in component B exceeds the quantity of epoxy groups in component A to such an extent that the resulting copolymer has an acid number of at least 15 mg of KOH/g, and wherein the viscosity of a 50% strength solution in butyl acetate at 23° C. does not exceed 2,000 mPa s.

* * * * *